United States Patent [19]

Chan et al.

[11] Patent Number: 5,351,619

[45] Date of Patent: Oct. 4, 1994

[54] GAS GENERATOR IGNITED BY LAMINA OR FILM

[75] Inventors: Sek K. Chan, Sr. Bruno, Canada; Graeme A. Leiper, Prestwick; Steven J. Graham, Fairlie, both of Scotland

[73] Assignees: Imperial Chemical Industries PLC, London, England; ICI Canada, Inc., Ontario, Canada

[21] Appl. No.: 843,942

[22] Filed: Feb. 18, 1992

[30] Foreign Application Priority Data

Feb. 18, 1991 [GB] United Kingdom .............. 9103372.0
Aug. 1, 1991 [GB] United Kingdom .............. 9116566.2

[51] Int. Cl.$^5$ ............................................. C06B 45/00
[52] U.S. Cl. ................................. 102/289; 102/290;
  /
[58] Field of Search ................................. 102/289, 290

[56] References Cited

U.S. PATENT DOCUMENTS

| | | | |
|---|---|---|---|
| 3,636,881 | 1/1972 | Godfrey | 102/103 |
| 3,700,762 | 10/1972 | Carpenter et al. | 264/3 |
| 4,062,709 | 12/1977 | Castaneda et al. | 149/19.3 |
| 4,149,465 | 4/1979 | Verkozen | 102/45 |
| 4,408,534 | 10/1983 | Araki et al. | 102/288 |
| 4,572,078 | 2/1986 | Bell | 102/469 |
| 4,702,167 | 10/1987 | Reinelt et al. | 102/282 |
| 4,864,932 | 9/1989 | Reinelt et al. | 102/282 |
| 5,024,159 | 6/1991 | Walley | 102/289 |
| 5,024,160 | 6/1991 | Canterberry et al. | 102/323 |
| 5,101,730 | 4/1992 | Bender et al. | 102/288 |
| 5,101,731 | 4/1992 | Adams | 102/290 |

FOREIGN PATENT DOCUMENTS

| | | |
|---|---|---|
| 1514293 | 2/1968 | France . |
| 2489419 | 3/1982 | France . |
| 8837 | of 1910 | United Kingdom . |
| 3432291 | 3/1986 | United Kingdom . |
| WO8707888 | 12/1987 | World Int. Prop. O. . |
| WO9010611 | 9/1990 | World Int. Prop. O. . |

OTHER PUBLICATIONS

U.S. Statutory Invention Registration, No. H169, Published Dec. 1986, Mackenzie et al., "Ignition Composition".

*Primary Examiner*—Peter A. Nelson
*Attorney, Agent, or Firm*—Cushman, Darby & Cushman

[57] ABSTRACT

A vehicle occupant safety restraint gas generator is provided in which the ignition system for the propellant comprises a pyrotechnic layer (22), e.g. a reactive film, preferably comprising a substrate of oxidizing polymeric film such as polytetrafluoro-ethylene (PTFE) having at least a portion of its surface covered with a layer of oxidizable material, for example magnesium, which may be vapour-deposited on the surface. The propellant is preferably a propellant train (12, 14, 16, 18) which comprises a plurality of adjacent propellant grains such as toroidal discs which surround the pyrotechnic layer or are completeley encased thereby. The gas generator is simpler and more economical to manufacture, and has improved safety during use.

21 Claims, 3 Drawing Sheets

GAS GENERATOR IGNITED BY LAMINA OR FILM

FIELD OF THE INVENTION

This invention relates to gas generating devices having a novel ignition system, such devices may be advantageously used in occupant safety restraint systems in vehicles. The invention also includes a method of igniting propellant charges.

DESCRIPTION OF THE RELATED ART

Various pyrotechnic propellants have been proposed for generating a gas upon combustion in order to inflate a so-called air bag (i.e. an inflatable cushion of a vehicle occupant safety restraint system) so as to cushion and restrain movement of an occupant in the event of a sudden deceleration of the vehicle, such as is caused by a collision. In order to be employed in the restraint system, the propellant used should be capable of producing a large volume of a non-toxic, non-flammable and essentially smokeless gas within a very short time, e.g. within 60 to 100 milliseconds. The use of such propellant compositions is described, for example, in U.S. Pat. Nos. 3,895,098; 4,376,002 and 4,734,141.

Typical propellants currently used in the industry are based primarily on alkali metal azide, such as sodium azide, since the azide produces a gas which is almost totally nitrogen. Various additives, such as for example metal oxides, can be added to the azide as oxidizer and combustion product modifier.

The azide mixture is typically formed into a cylindrical body called a grain of about 35 mm diameter by 5 mm thickness, or into a pellet of about 8 to 10 mm diameter by about 5 mm thickness by compaction of an essentially dry formulation of the azide mixture. Such a grain or pellet has improved physical properties over a loose particulate collection of azide mixture, and is thus more resistant to physical deterioration caused by vibrations and the variable, and sometimes extreme, environmental conditions in an automobile.

In an installed system a plurality of grains are typically packed in a chamber so that each grain is in side-by-side relationship with the adjacent grain, thus creating a propellant train. Pellets are usually loosely packed within a suitably sized housing.

In order to inflate the "air-bag", it is desirable to generate an increasing amount of gas as the bag is filling. The rate at which gas is generated is dependent on a variety of factors such as the burn rate of the material used, the pressure in the gas chamber, and the surface of the burning material.

As is known within the propellant art, the propellant grains are generally prepared having a number of holes through the grain. Combustion is initiated on all external surfaces of the grain and also on the inner surface of the holes so that volume of gas generated can be controlled as the hole becomes progressively larger during the burning period. The holes are spaced so as to insure that all of the grain has been burned within the desired time period, the distance between holes being dependent on the burn rate of the propellant mixture, under the conditions used. The maximum distance between holes which will allow complete combustion of the grain to occur within the selected time period is termed the web thickness.

The propellant is typically ignited by a rapidly reacting squib, which is electrically connected to a diagnostic center which in turn is connected to a series of sensors within the vehicle. Upon receiving a suitable signal from the sensors, the diagnostic center provides an electric signal to fire the squib The squib generally comprises a hot wire device, which causes ignition of an adjacent reactive material. When ignited, the propellant burns from the exposed surfaces until the propellant is consumed.

In order to improve the ignition properties of the grain, Hamilton et al., in U.S. Pat. No. 4,244,758, describe a nitrogen gas generator containing azide grains, which grains have been coated with an ignition enhancer. Coating of the grain with an ignition enhancer is conducted, by dipping the pressed grain into a solution of the ignition enhancer mixture in a solvent such as methylene chloride or acetone. The solvent is allowed to flash-off and thus leave a residential coating of the ignition enhancer. However, the use of a flammable solvent increases the danger of the grain production process.

The violent reaction of a typical prior art ignition system may crack and thus damage the grain in the immediate vicinity of the squib. This uncontrolled cracking of the grain leads to an unpredictable increase in the exposed surface area of the grain. For grains which have been weakened through vibration, inadequate pressing, or exposed to high temperatures, the amount of cracking can lead to an excessively rapid propellant combustion rate, and thus an excessively rapid initial gas release. Under certain conditions, the excessive, rapid gas release can cause a rupture of the gas chamber wall.

Thus, it would be desirable to provide a method for the ignition of the propellant which eliminates the need for a typical squib assembly, and which avoids the solvent-borne coating process of the grain with an ignition enhancer.

Surprisingly, it has now been found that the propellant grains and pellets can be initiated by a pyrotechnic provided as a film or layer which film or layer is wrapped around or embedded in the propellant.

It is an object of the present invention to provide a gas generator for use in a vehicle occupant passive restraint system, which gas generator is ignited by a pyrotechnic such that the propellant is not subjected to excessive cracking and is positively ignited over a substantial area of surface.

SUMMARY OF THE INVENTION

Accordingly, the present invention provides a gas generating device comprising a compacted particulate gas-generating propellant charge and a pyrotechnic igniter for said propellant charge wherein the pyrotechnic igniter is a performed lamina or film comprising a pyrotechnic layer in ignition transmission relationship with the propellant charge. The pyrotechnic layer is preferably in operative surface abutment contact with said propellant or at least closely confronting surface regions of the propellant.

The term gas generating device is used to mean any system which gives off gas as a result of auto-combustion, but especially directed to a propellant system of use in a vehicle "air-bag" passive restraint system.

The layer of pyrotechnic may extend over only a portion of the surface of the propellant, but more preferably, in the case of a solid cylindrical body of propellant, covers the entire external unenclosed surface of the propellant in order to ensure rapid initiation of the entire propellant charge.

The lamina or film may comprise a sheet of carrier material which has been coated with a layer of pyrotechnic, but preferably comprises a substrate of an oxidizing polymeric film having a layer of an oxidizable material on at least a portion of at least one surface of said substrate, and said polymeric film and said oxidizable material are conjointly capable of reacting together exothermically on ignition.

A particularly preferred pyrotechnic film layer is described by Allford in PCT International Publications No. WO 0/10611 and WO 90/10724. The film layers described therein contain atoms chemically bound therein selected from the group consisting of halogens (especially fluorine), oxygen, sulphur, nitrogen and phosphorous. One preferred film layer is made from fluoropolymer such as polytetrafluoro-ethylene (PTFE) which produces high energy pyrotechnic films, but other suitable polyeric films include those made from polyhexafluoropropylene, copolymers of vinylidene fluoride and hexafluoropropylene, copolymers of tetrafluoroethylene and perfluoropropyiene, copolymers of chlorotrifluoroethylene and vinylidene fluoride, homopolymers of perfluoropropylene and its copolymers with vinylidene fluoride, trichloroethylene homopolymer and its copolymers with vinylidene fluoride, and mixtures of two or more of such polymers with each other or with PTFE.

The oxidizable material is advantageously vapour-deposited on the film layer and may suitably comprise a metal selected from the group consisting of lithium, sodium, magnesium, beryllium, calcium, strontium, barium, aluminum, titanium, zirconium, and alloys thereof. A most preferred metal is magnesium or an alloy thereof preferably coated on to a fluoropolymer substrate. Preferably the ratio of metal to the layer of oxidizing polymeric film is substantially stoichiometric at the location of the film underlying the metal.

The pyrotechnic film or layer may be initiated by a variety of ignition means for example a squib, shock tubing, exploding bridge wire, a semi-conductor bridge, a spark discharge, an electric current or a hot wire. Once initiated, the pyrotechnic film or layer rapidly ignites the adjacent propellant.

While it is generally preferred that a continuous sheet of the pyrotechnic film or layer is used to ignite the compacted propellant body, the film or layer may be laid in strips of a designed pattern adjacent to the propellant in order to control the surface area of directly ignited propellant, or to control the direction of the ignition path over the surface of the propellant.

The propellant charge may advantageously be encased in an envelope or pouch of the lamina or film comprising the pyrotechnic layer, which lamina or film may be glued or sealed (e.g. heat-sealed) at abutting or lapped edges. In order to facilitate heat-sealing, portions of the surface of the substrate polymeric film may be left uncovered.

The film or layer may comprise a polymeric film which is essentially impervious to air and/or moisture, and thus, the propellant may be vacuum sealed, or sealed in an inert gas, within the film layer, to improve the long term stability of the propellant. The pyrotechnic film could be shrink-wrapped. A range of polymers and copolymers of fluoro/chloro carbon monomers are now available which not only are at least as reactive as PTFE with, say, magnesium but may be heat formed and heat-sealed. The presence of a metallic conducting layer affords the possibility of testing installed systems for continuity of ignition circuitry and integrity or propellant train.

The propellant may be any known propellant which is suitable for use in the vehicle occupant passive restraint system. Most preferred are sodium azide based compositions which may contain metal oxides, such as for example iron or nickel oxide, and other ingredients known in the art. A suitable composition contains, for example, (by weight), 59.5% sodium azide, 36.5% ferric oxide and 4% bentonite.

The propellant charge may consist of compacted propellant pellets or discs stacked adjacently end-to-end to form a propellant train. The propellant discs may have one or more holes formed therethrough to facilitate burning and the rapid discharge of gaseous combustion products.

One advantageous form of compacted propellant disc has projecting portions, for example, peripheral protrusions or castellations formed on at least one of the cylindrical end surfaces of the disc to provide escape routes for the combustion gases. In one advantageous form of cylindrical disc the projecting portions are shaped so that when the discs are stacked a series of channels preferably radially offset channels, is provided to facilitate the flow of gas from the center to the outside of the stack, thereby aiding ignition and flame spread and reducing the pressure differentials within the stack. The projecting portions are preferably shaped so that the area of the projection is greater than the area therebetween in order to prevent close packing of the discs.

The compacted propellant disc may advantageously be a toroidal disc, preferably of rectangular solid section and optionally having castellations on one or both end surfaces, such discs forming a hollowed right cylindrical propellant charge when a plurality of discs are stacked end-to-end. In general, however, the inner and outer surfaces of the hollowed cylinder formed by the toroidal discs may have any desired polyhedral or rounded form. Preferably, the inner longitudinal surface of the hollowed cylinder is circular in cross section and has a diameter which is around ⅓ of the "diameter" of the outer longitudinal surface.

The toroids may suitably be around about 5 mm thick, about 36 mm in outer diameter and about 12 mm in inner diameter and there may be some 30 to 40 in the stack constituting the propellant body.

In this arrangements the lamina or film comprising the pyrotechnic layer may desirably be laid so that it confronts the inner toroid surfaces as a tubular insert e.g. a continuous tube, a lapped sheet, or a tubular pouch (optionally hermetically sealed) containing further propellant material such as potassium nitrate or perchlorate mixed with metal fuels such as boron and titanium, or sodium azide (which can react with an oxidizing polymeric film). Such additional propellant powder advantageously alters the energy release rate and may generate more gaseous products than the lamina or film.

Advantageously, the lamina or film may be wrapped around a central rigid former for example a solid rod or a solid, perforated or mesh tube and the former may optionally contain a propellant charge. The lamina or film may be wrapped as a single or multiple wrap applied, for example, as a spirally or helically wrapped film. The film wrapping may advantageously be slit through at one or more positions to provide venting passages. The wrapped film may optionally be placed inside a perforated tubular housing. The use of a former prevents collapse of the lamina or film under the initial ignition pulse from the igniter thereby ensuring that the lamina or film is presented to the igniter in a suitable manner for obtaining efficient ignition of the lamina or film. Moreover the former, especially if it is solid, reduces the free space in the generator thereby increasing the rate of pressure increase during the ignition.

Also, if desired, discs of the lamina or film conforming to the shape of the propellant discs may be interleaved between some or all of the stacked propellant discs and portions of the lamina or film may also be located in the channels provided by stacked castellated discs. The stacked discs are preferably formed of pressed gas-generate material as totally solid bodies free of deliberately introduced perforations or internally formed gas-escape holes. The discs may be housed in a close-fitting metal tube, which may be perforated for easy peripheral gas release.

The invention also includes a method of igniting a compacted particulate gas-generating propellant charge wherein a performed lamina or film comprising a pyrotechnic layer is placed in ignition transmission relationship with the propellant charge and the said lamina or film is ignited.

The use of a pyrotechnic film or layer as in the present invention allows the ignition system for vehicle occupant restraint systems to be simplified without sacrificing reliability.

BRIEF DESCRIPTION OF THE DRAWING

The invention will now be described by way of example only with reference to the attached drawings, wherein:

FIG. 5 is a schematic exploded perspective view of further alternative gas generator with the outer tubular metal housing cut away, together with a tubular igniter for insertion therein;

DESCRIPTION OF THE PREFERRED EMBODIMENTS

Figure 1:
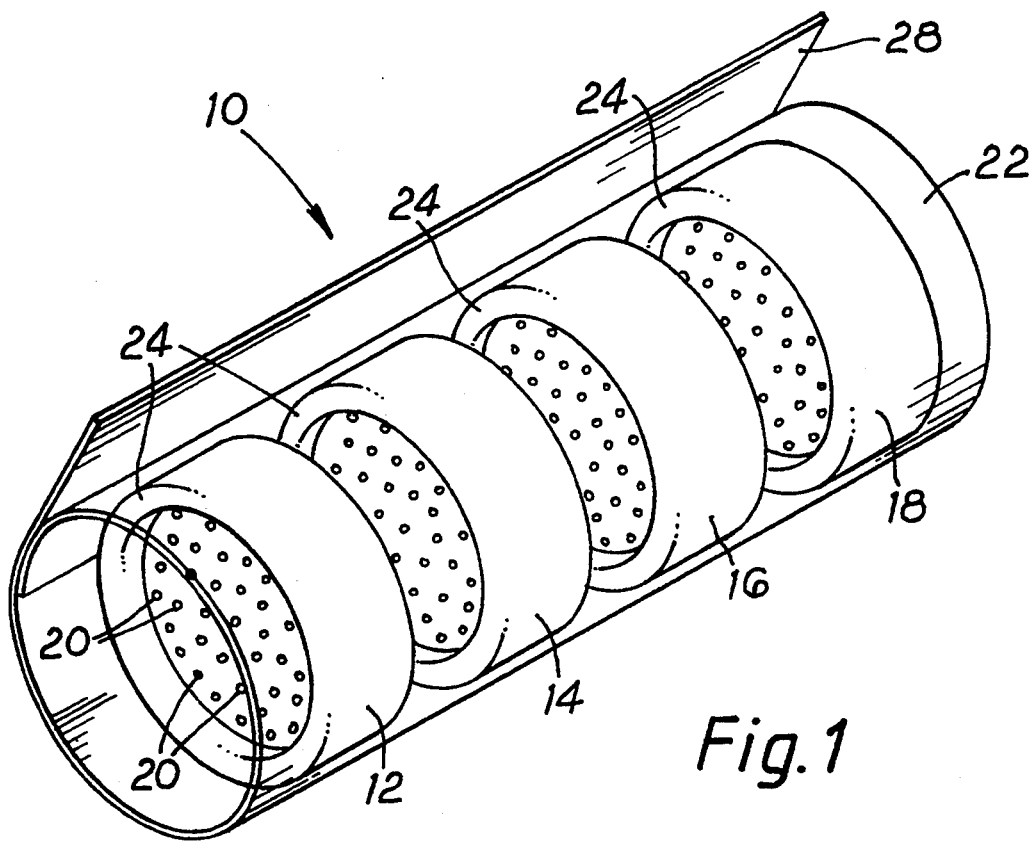
FIG. 1 is an exploded perspective drawing (not to scale) of a gas generator assembly according to the present invention having a plurality of grains (compacted discs)

In FIG. 1, a gas generator 10 is shown having four propellant grains 12, 14, 16 and 18 stacked end to end. Through each grain are a number of holes 20. All four grains 12, 14, 16 and 18 are encased within a pyrotechnic film layer 22 which envelops the stack of grains.

Propellant grains 12, 14, 16 and 18 are manufactured from a mixture comprising sodium azide and ferric oxide in a molar ratio of about 4:1. The loose powder mixture is compacted within a pressure chamber in order to create a dense coherent cylindrical grain of 35 mm diameter which is about 5 mm thick. The pressure chamber is fitted with a number of pins which extend through the chamber and thus create a series of holes 20 within grains 12, 14, 16, 18.

Figure 2:
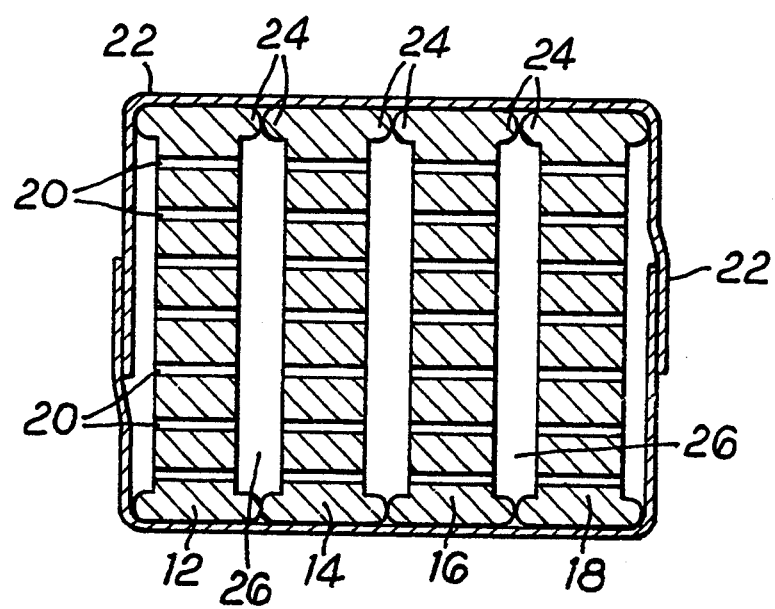
FIG. 2 is a cross-sectional representation of the gas generator of FIG. 1, along the longitudinal axis.

Grains 12, 14, 16 and 18 are formed having a series of peripheral protrusions 24, best seen in FIG. 2, which protrusions maintain a gap 26 between the radially inward regions of the end faces of grains in order to allow the gases created by combustion of the grains to escape.

Grains 12, 14, 16 and 18 form a propellant train. Pyrotechnic film layer 22 is wrapped around the propellant train. The loose edge 28 of film layer 22 (shown raised) is glued to the underlying surface of film layer 22, as are the ends of film layer 22 which extend beyond outer grains 12 and 18.

Figure 3:
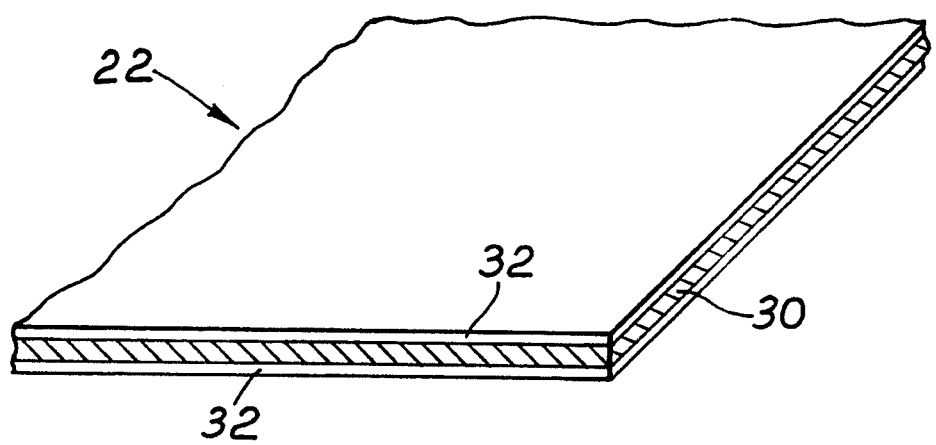
FIG. 3 is a perspective drawing of a pyrotechnic film layer of use in the present invention.

Pyrotechnic film 22 shown in more detail in FIG. 3 has a 45 micron thickness layer 30 of the fluoropolymer Teflon as a substrate of oxidizable polymer, on which is deposited a 16 micron thickness layer 32 of magnesium on each side of layer The magnesium layer is deposited by vapour deposition as described in WO 90/10724.

In operation, gas generator 10 is fitted within a gas chamber which gas chamber is adapted to be located within the vehicle passive restraint system. Gas generator 10 is positioned adjacent to an electrical igniter (not shown) which igniter ensures ignition of pyrotechnic layer 22 but without causing damage to grains 12, 14, 16 or 18. Pyrotecnnic Layer 22 burns rapidly from its ignition point and ignites the regions the grains 12, 14, 16 or 18 with which it is in contact. The burning of the grains generates the gas used to inflate the air bag.

The gas generator may have additional grains depending on the desired gas volume to be generated.

Figure 4:
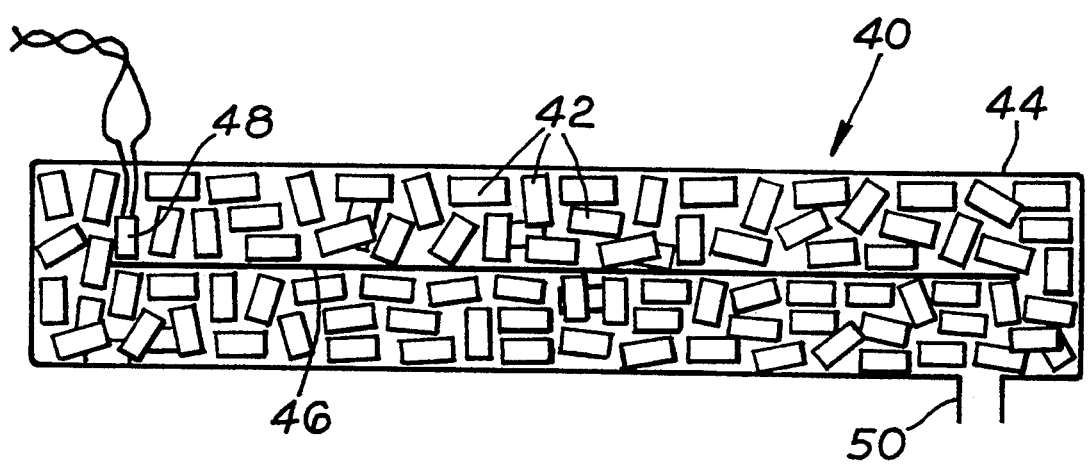
FIG. 4 is a cross-sectional representation of an alternative gas generator, taken along the longitudinal axis.

In FIG. 4, a gas generator 40 is shown having a number of propellant pellets 42 within a performed housing 44. Pellets 42 are made of the same azide based formulation as grains 16, 18 and 20. Also located within housing 44 is a layer of pyrotechnic film 46 made of the same material as described with respect to FIG. 3. A portion of film 46 is adjacent to an electrical igniter 48 so that when the igniter is fired, film 46 is ignited. As film 46 burns, pellets 42 are ignited to generate gas which is fed to the air bag (not shown) through vent 50 in housing 44.

In FIG. 5, a gas generator 60 is shown which is made up of a vertical stack of toroidal grains 61 (a few only shown but numbering, say, 30 in total) within a metal tubular housing 62 having gas-escape holes 63.

The toroidal grains 61 are annular discs, with flat top and bottom surfaces, circular cylindrical inner and outer longitudinal surfaces, and hence of rectangular solid section in any axial plane. The discs 61 are stacked on top of each other and are in direct surface contact but may be interleaved with spacer sheets of pyrotechnic film, if desired, which conform in shape to the upper and lower surfaces of the discs 61. Suitable convenient dimensions for the discs 61 are as hereinbefore suggested. The central hole through the stack of toroidal discs 61 contains a tubular igniter 64 of heat-sealed metalised pyrotechnic film (here shown outside the assembly) which makes a good fit within the central hole of the stack and may itself serve as a pouch for additional pyrotechnic or a mixture metal fuel and oxidizing material which may be desired in order to modify the burn characteristics and gas emission profile the gas generator 60. An electrical igniter 65 with electrical lead wires 66 is shown affixed to the tube 64.

In operation, the igniter 65 is activated and fires the igniter 64 (.e.g. Mg metal reacting with poly-fluoro-chloro-ethylene substrate film over one or both sides of the film). In turn the igniter 64 ignites the stack of toroidal discs 61 and any interleaved pyrotechnic film spacers (not shown in FIG. 5). Combustion gases rapidly escape through holes 63 and end ports (not shown) in the housing 62 axed thence through filters and ducts (not shown) to the inflatable bag (not shown) which is the passenger restraint or so-called "airbag".

Figure 6:
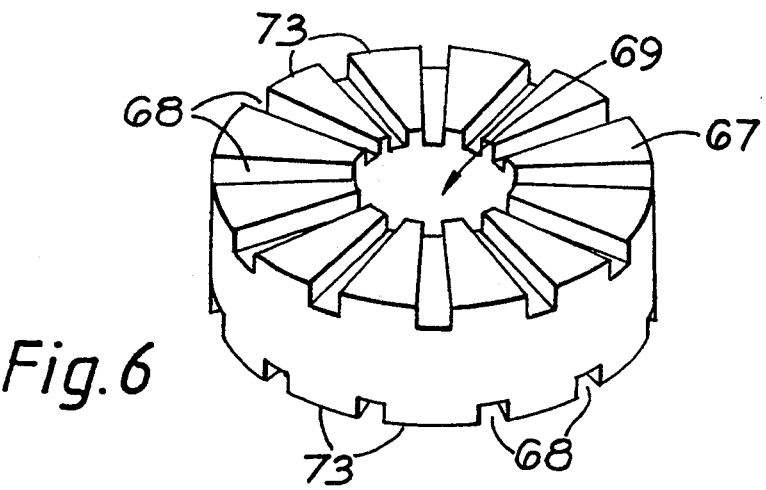
FIG. 6 shows in perspective a castellated compacted propellant disc suitable for the generation of FIG. 5.
Figure 7:
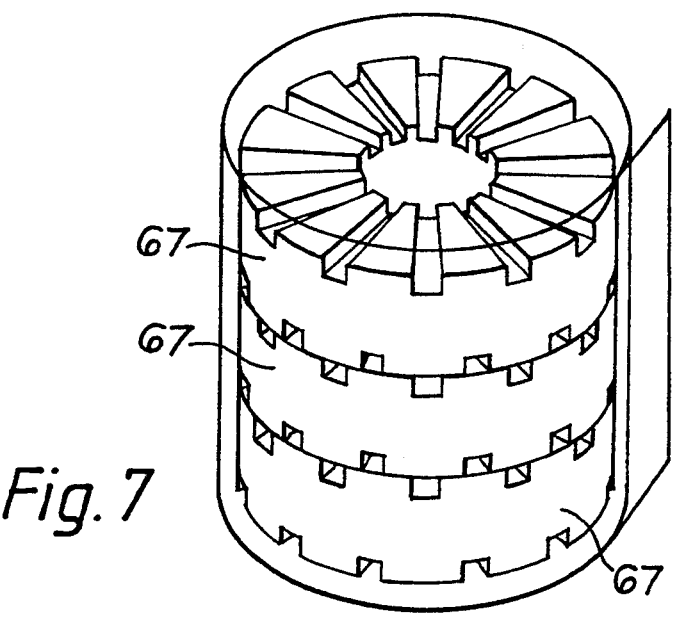
FIG. 7 shows three of the discs of FIG. 6 as stacked in a gas generator assembly.

In an alternative form of toroidal disc shown in FIG. 6 which is also suitable for the generator of FIG. 5, the top and bottom surfaces of the disc 67 have projecting portions 73 (castellations) defining radially offset channels 68. When the discs 67 are stacked end-to-end as shown in FIG. 7 the channels 68 allow gas flow and flame spread from the central core 69 to the outer surfaces. The circumferential dimension of the channels 68 is less than the circumferential dimension of the projection portion between the channels in order to prevent the projections entering and obstructing the channels when the discs are stacked in a generator.

Figure 8:
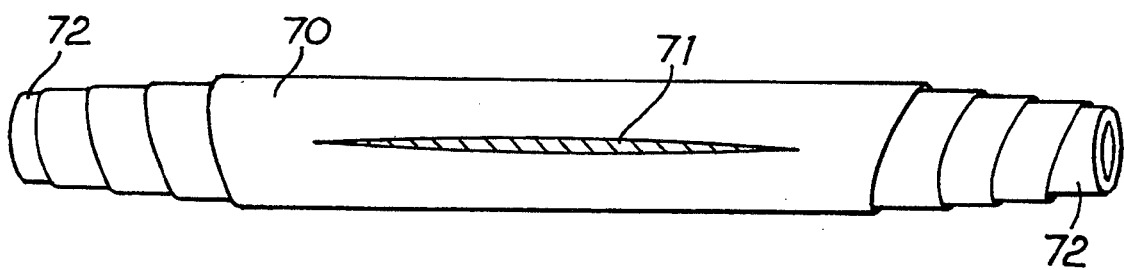
FIG. 8 is a front view of a modification of the igniter of FIG. 5.

The modified igniter shown in FIG. 8 may replace the igniter 64 of the generator of FIG. 5, consists of a central former 72 wrapped with a spiral wrapping 70 of the pyrotechnic film shown in FIG. 3. The wrapping 70 is split through (one or more times) to provide at least one longitudinal venting passage 71 in the film. In a further modification (not shown) the igniter shown in FIG. 8 is encased in a perforated tubular housing.

We claim:

1. A gas generating device comprising:
   a compacted particulate gas-generating propellant charge; and
   a pyrotechnic igniter for said propellant charge, said pyrotechnic igniter comprising a lamina or film comprising a pyrotechnic layer, and said pyrotechnic layer being in ignition transmission relationship with said propellant charge.

2. A device as claimed in claim 1 wherein said lamina or film encloses or is enclosed by the propellant charge.

3. A device as claimed in claim 1 wherein said lamina or film comprises a substrate of an oxidizing polymeric film having a layer of an oxidizable material on at least a portion of at least one surface of said substrate, and said polymeric film and said oxidizable material are conjointly capable of reacting together exothermically on ignition.

4. A device as claimed in claim 3 wherein the oxidizing polymeric film contains atoms chemically bound therein and selected from the group consisting of halogens, oxygen, sulphur, nitrogen and phosphorous.

5. A device as claimed in claim 4 wherein the oxidizing polymeric film is made from a polymer selected from the group consisting of polytetrafluoro-ethylene (PTFE), polyhexafluoropropylene copolymers of vinylidene fluoride and hexafluoropropylene, copolymers of tetrafluoroethylene and perfluoropropylene, copolymers of chlorotrifluoroethylene and vinylidene fluoride, homopolymers of perfluoropropylene, copolymers of perfluoropropylene and vinylidene fluoride, trichloroethylene homopolymer, copolymers of trichloroethylene and vinylidene fluoride and mixtures of two or more of such polymers.

6. A device as claimed in claim 3 wherein the oxidizable material is vapour-deposited on the film.

7. A device as claimed in claim 3 wherein the oxidizable material comprises a metal selected from the group consisting of lithium, sodium, magnesium, beryllium, calcium, strontium, barium, aluminum, titanium, zirconium and alloys of such metals.

8. A device as claimed in claim 7 wherein the ratio of metal to the oxidizing polymeric film is substantially stoichiometric at the location of the film underlying the metal.

9. A device as claimed in claim 1 wherein the propellant charge is encased in an envelope or pouch of the lamina or film comprising the pyrotechnic layer.

10. A device as claimed in claim 9 wherein the lamina or film comprises a polymeric film which is impervious to air or moisture and the propellant charge is sealed within the lamina or film.

11. A device as claimed in claim 1 wherein the propellant charge comprises a sodium azide based composition.

12. A device as claimed in claim 1 wherein the propellant charge comprises compacted pellets or discs stacked adjacently end-to-end to form a propellant train.

13. A device as claimed in claim 12 wherein the propellant charge comprises compacted propellant discs having projecting portions or castellations formed on at least one of the cylindrical end surfaces of the disc.

14. A device as claimed in claim 13 wherein the projecting portions are shaped so that when the discs are stacked a series of radially offset channels is provided to facilitate the flow of gas from the center to the outside of the stack.

15. A device as claimed in claim 13 wherein the area of the projecting portions is greater than the area therebetween.

16. A device as claimed in claim 12 wherein the compacted propellant discs are toroidal discs.

17. A device as claimed in claim 16 wherein the lamina or film comprising the pyrotechnic layer confronts the inner toroid surfaces as a tubular insert optionally containing further propellant material.

18. A method of igniting a compacted particulate gas-generating propellant charge wherein a performed lamina or film comprising a pyrotechnic layer is placed in ignition transmission relationship with the propellant charge and the said lamina or film is ignited.

19. A gas generating device comprising:
   a compacted particulate gas-generating propellant charge comprising compacted pellets or discs stacked adjacently end-to-end to form a propellant train; and
   a pyrotechnic igniter in ignition transmission relationship with said propellant charge, said pyrotechnic igniter comprising a lamina or film comprising a substrate of an oxidizing polymeric film having a layer of an oxidizable material on at least a portion of at least one surface of said substrate, said polymeric film and said oxidizable material being conjointly capable of reacting together exothermically on ignition, said oxidizing polymeric film containing atoms chemically bound therein and selected from the group consisting of halogens, oxygen, sulphur, nitrogen and phosphorous, and said oxidizing polymeric film being made from a polymer selected from the group consisting of polytetrafluoro-ethylene (PTFE), polyhexafluoropropylene copolymers of vinylidene fluoride and hexafluoropropylene, copolymers of tetrafluoroethylene and perfluoropropylene, copolymers of chlorotrifluoroethylene and vinylidene fluoride, homopolymers of perfluoropropylene, copolymers of perfluoropropylene and vinylidene fluoride, trichloroethylene homopolymer, copolymers of trichloroethylene and vinylidene fluoride and mixtures of two or more of such polymers.

20. A gas generating device comprising:

a compacted particulate gas-generating propellant charge comprising compacted pellets or discs stacked adjacently end-to-end to form a propellant train; and a pyrotechnic igniter in ignition transmission relationship with said propellant charge, said pyrotechnic igniter comprising a lamina or film comprising a substrate of an oxidizing polymeric film having a layer of an oxidizable material on at least a portion of at least one surface of said substrate, said polymeric film and said oxidizable material being conjointly capable of reacting together exothermically on ignition, said oxidizing polymeric film containing atoms chemically bound therein and selected from the group consisting of halogens, oxygen, sulphur, nitrogen and phosphorous, and said oxidizable material comprises a metal selected from the group consisting of lithium, sodium, magnesium, beryllium, calcium, strontium, barium, aluminum, titanium, zirconium and alloys of such metals.

21. A method of generating gas comprising the steps of:

igniting a pyrotechnic igniter comprising a lamina or film comprising a substrate of an oxidizing polymeric film having a layer of an oxidizable material on at least a portion of at least one surface of said substrate, said polymeric film and said oxidizable material being conjointly capable of reacting together exothermically on ignition, wherein said ignited pyrotechnic igniter ignites a compacted particulate gas-generating propellant charge to thereby generate said gas.

* * * * *